United States Patent
Kennedy

(10) Patent No.: US 9,987,906 B2
(45) Date of Patent: Jun. 5, 2018

(54) SYSTEMS AND METHODS FOR POWERING A TRANSPORT REFRIGERATION SYSTEM

(71) Applicant: THERMO KING CORPORATION, Minneapolis, MN (US)

(72) Inventor: Pierce Dominic Kennedy, Galway (IE)

(73) Assignee: THERMO KING CORPORATION, Minneapolis, MN (US)

( * ) Notice: Subject to any disclaimer, the term of this patent is extended or adjusted under 35 U.S.C. 154(b) by 127 days.

(21) Appl. No.: 14/434,242

(22) PCT Filed: Sep. 24, 2013

(86) PCT No.: PCT/US2013/061347
§ 371 (c)(1),
(2) Date: Apr. 8, 2015

(87) PCT Pub. No.: WO2014/058610
PCT Pub. Date: Apr. 17, 2014

(65) Prior Publication Data
US 2015/0231948 A1    Aug. 20, 2015

Related U.S. Application Data

(60) Provisional application No. 61/710,914, filed on Oct. 8, 2012.

(51) Int. Cl.
*F25B 27/00*   (2006.01)
*B60H 1/00*   (2006.01)
(Continued)

(52) U.S. Cl.
CPC ......... *B60H 1/3222* (2013.01); *B60H 1/3232* (2013.01); *B60P 3/20* (2013.01)

(58) Field of Classification Search
CPC . F25B 27/00; B60H 1/00264; B60H 1/00364; B60H 1/00428; H02P 9/107; H02J 3/46; B60P 3/20
(Continued)

(56) References Cited

U.S. PATENT DOCUMENTS 2,313,439 A    3/1943   Horton
2,669,098 A    1/1950   Buell
(Continued)

FOREIGN PATENT DOCUMENTS

CN    101165437    4/2008
CN    101969224    2/2011
(Continued)

OTHER PUBLICATIONS

Chinese Office Action issued in corresponding Chinese Application No. 201380052387.9 dated Jun. 1, 2016 (11 pages), English translation.
(Continued)

*Primary Examiner* — Frantz Jules
*Assistant Examiner* — Erik Mendoza-Wilkenfel
(74) *Attorney, Agent, or Firm* — Hamre, Schumann, Mueller & Larson, P.C.

(57) ABSTRACT

Systems and methods are directed to providing power to a transport refrigeration system (TRS) using an undersized main power source in combination with a secondary power source. The systems and methods allow the undersized main power source to be used with a TRS that requires a power more than a maximum threshold power of the undersized main power source to operate at a full cooling capacity. The secondary power supplements the undersized main power to allow the TRS to operate at the full cooling capacity. Optionally, a tertiary power source can supplement the
(Continued)

undersized main power source, or the undersized main and secondary power sources to run the TRS.

19 Claims, 3 Drawing Sheets

(51) Int. Cl.
    *B60P 3/20*     (2006.01)
    *H02P 9/00*     (2006.01)
    *H02J 3/46*     (2006.01)
    *B60H 1/32*     (2006.01)

(58) Field of Classification Search
    USPC .................. 307/53, 57, 59, 74, 80, 81, 84, 8
    See application file for complete search history.

(56) References Cited

U.S. PATENT DOCUMENTS

| | | | |
|---|---|---|---|
| 2,880,595 | A | 4/1959 | Mcguffey et al. |
| 4,549,403 | A | 10/1985 | Lord et al. |
| 5,265,435 | A | 11/1993 | Richardson |
| 6,223,546 | B1 | 5/2001 | Chopko et al. |
| 6,543,243 | B2 | 4/2003 | Mohrmann et al. |
| 6,688,125 | B2 | 2/2004 | Okamoto et al. |
| 6,755,041 | B2 | 6/2004 | Wessells et al. |
| 7,150,159 | B1 | 12/2006 | Brummett et al. |
| 7,673,466 | B2 | 3/2010 | Pacy |
| 8,056,329 | B2 | 11/2011 | LaRose |
| 2004/0239202 | A1* | 12/2004 | Dooley ............... H02K 1/2786 310/184 |
| 2009/0229288 | A1* | 9/2009 | Alston ............... B60H 1/00428 62/236 |
| 2009/0314019 | A1 | 12/2009 | Fujimoto et al. |
| 2010/0017045 | A1* | 1/2010 | Nesler ................. B60L 11/1824 700/296 |
| 2010/0089083 | A1 | 4/2010 | Awwad et al. |
| 2010/0102637 | A1* | 4/2010 | Dozier ..................... H02J 3/46 307/84 |
| 2010/0171364 | A1 | 7/2010 | Awwad |
| 2010/0229581 | A1* | 9/2010 | Truckenbrod ......... B60H 1/004 62/236 |
| 2010/0289273 | A1 | 11/2010 | Steele et al. |
| 2010/0327600 | A1 | 12/2010 | Koelsch et al. |
| 2011/0018340 | A1* | 1/2011 | Patterson .................. H02J 1/12 307/10.1 |
| 2011/0018349 | A1 | 1/2011 | Rockenfeller et al. |
| 2011/0109157 | A1 | 5/2011 | Tani |
| 2011/0225987 | A1 | 9/2011 | Bowdish |
| 2011/0247350 | A1 | 10/2011 | Awwad et al. |
| 2012/0013132 | A1 | 1/2012 | Lebeau et al. |

FOREIGN PATENT DOCUMENTS

| | | |
|---|---|---|
| CN | 102422101 | 4/2012 |
| EP | 1046525 | 10/2000 |
| WO | 2011/019607 | 2/2011 |

OTHER PUBLICATIONS

International Search Report and Written Opinion for International Application No. PCT/US2013/061347, dated Dec. 20, 2013, 11 pgs.
Extended European Search Report issued in corresponding European Application No. 13845767.6 dated Feb. 3, 2018 (7 pages).

* cited by examiner

SYSTEMS AND METHODS FOR POWERING A TRANSPORT REFRIGERATION SYSTEM

FIELD OF TECHNOLOGY

The embodiments disclosed herein relate generally to a transport refrigeration system ("TRS"). More particularly, the embodiments disclosed herein relate to providing power to a TRS.

BACKGROUND

Existing transport refrigeration systems are used to cool containers, trailers, and other similar transport units (typically referred to as a "refrigerated transport unit"). Modern refrigerated transport units may be efficiently stacked for shipment by ship or rail. Typically, when refrigerated transport units are shipped by tractor, a single refrigerated transport unit is placed on a trailer chassis. When cargo in the container includes perishable products (e.g., food product, flowers, etc.), the temperature of the refrigerated transport unit must be controlled to limit loss of the cargo during shipment.

There are strict governmental regulations covering engine emissions from engines that run at or over 25 horsepower (HP). Some engines that meet these regulations may be too large to fit in a TRS. Engines that run at or under 25 HP have less restrictive regulations and can fit into a TRS. However, in some instances, a TRS may need more than 25 HP power to operate properly.

SUMMARY

The embodiments described herein are directed to providing power to a TRS using an undersized main power source in combination with a secondary power source.

Systems and methods described herewith allow the undersized main power source to be used with a TRS that requires a power more than a maximum threshold power of the undersized main power source to operate at a full cooling capacity. In some embodiments, the undersized main power source is, for example, a 25 HP engine.

In one embodiment, a TRS is provided that includes an undersized main power source and a secondary power source. The undersized main power source is configured to generate up to a maximum threshold power that is lower than the amount of power sufficient to run the TRS at a full cooling capacity. The secondary power source is configured to generate up to the maximum threshold power that is lower than the amount of power sufficient to run the TRS at the full cooling capacity. The undersized main power source and the secondary power source are configured to cooperate with one another to supply power to the TRS at the full cooling capacity.

In another embodiment, a method of supplying power to a TRS is provided. The method includes supplying a first amount of power to the TRS from an undersized main power source, where the first amount of power is lower than an amount of power to allow the TRS to operate at a full cooling capacity. The method also includes supplying a second amount of power to the TRS from a secondary power source, where the second amount of power is lower than the amount of power to allow the TRS to operate at the full cooling capacity. Also, the secondary power source supplements the undersized main power source to allow the TRS to operate at the full cooling capacity.

BRIEF DESCRIPTION OF THE DRAWINGS

Referring now to the drawings in which like reference numbers represent corresponding parts throughout.

DETAILED DESCRIPTION

The embodiments described herein are directed to providing power to a TRS using an undersized main power source in combination with a secondary power source.

References are made to the accompanying drawings that form a part hereof, and in which is shown by way of illustration of the embodiments in which the methods and systems described herein may be practiced. The term "refrigerated transport unit" generally refers to, for example, a temperature controlled trailer, container, or other type of transport unit, etc. The term "transport refrigeration system" or "TRS" refers to a refrigeration system for controlling the refrigeration of an internal space of the refrigerated transport unit. The term "tractor alternator" or "alternator" refers to an electromechanical device that is attached to a tractor and converts mechanical energy to electrical energy. The term "maximum threshold power" refers to the maximum amount of power that can be supplied by a power source. The term "undersized main power source" refers to a power source for a TRS that does not supply sufficient power for a TRS to operate at a full cooling capacity. The undersized main power source can be attached to a refrigerated transport unit. The term "secondary power source" refers to a power source for a TRS that supplements the amount of power supplied by the undersized main power source. The secondary power source can be attached to the refrigerated transport unit or be separate from the refrigerated transport unit.

Figure 1:
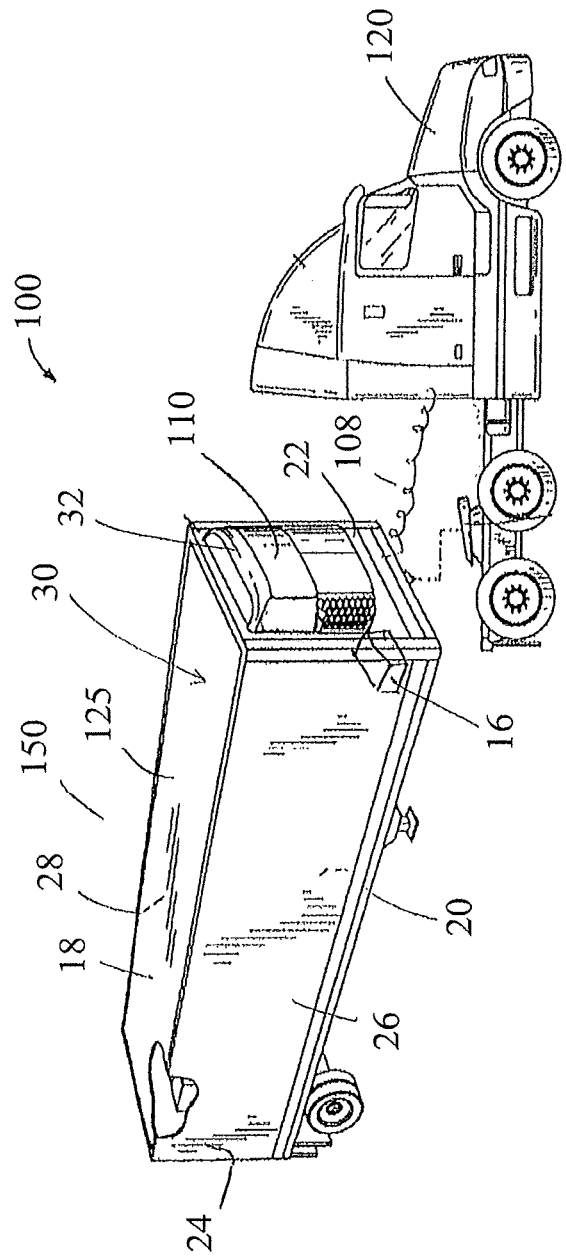
FIG. 1 illustrates a side perspective view of a refrigerated transport unit attached to a tractor, according to one embodiment.

FIG. 1 illustrates one embodiment of a TRS 100 for a refrigerated transport unit 150 that is attached to a tractor 120. The refrigerated transport unit 150 includes a transport unit 125 and the TRS 100. The tractor 120 is configured to tow the refrigerated transport unit 150. The transport unit 125 can be attached to the tractor 120 via a fifth wheel of the tractor 120. A flexible electrical connection 108 can connect an alternator (not shown) of the tractor 120 to the TRS 100. In some embodiments, the flexible electrical connection 108 is one or more suzi leads.

The TRS 100 includes a TRU 110 that controls refrigeration within the transport unit 125. The TRU 110 is connected to a generator set ("genset") 16 of the TRS 100. The transport unit 125 includes a roof 18, a floor 20, a front wall 22, a rear wall 24, and opposing sidewalls 26, 28. The TRU 110 is positioned on the front wall 22 of the transport unit 125. The TRS 100 is configured to transfer heat between a conditioned cargo space 30 and the outside environment.

As shown in FIG. 1, the TRU 110 is enclosed in a housing 32. The TRU 110 is in communication with the space 30 and controls the temperature in the space 30. The TRU 110 includes a closed refrigerant circuit (not shown) that regulates various operating conditions (e.g., temperature, humidity, etc.) of the space 30 based on instructions received from a TRS controller. The refrigerant circuit can be powered by the genset 16. In some embodiments, the refrigerant circuit can be powered by a secondary power source other than the genset. For example, in some embodiments, the refrigerant circuit can be powered by the alternator of the tractor, or by a battery or a battery bank.

Figure 2:
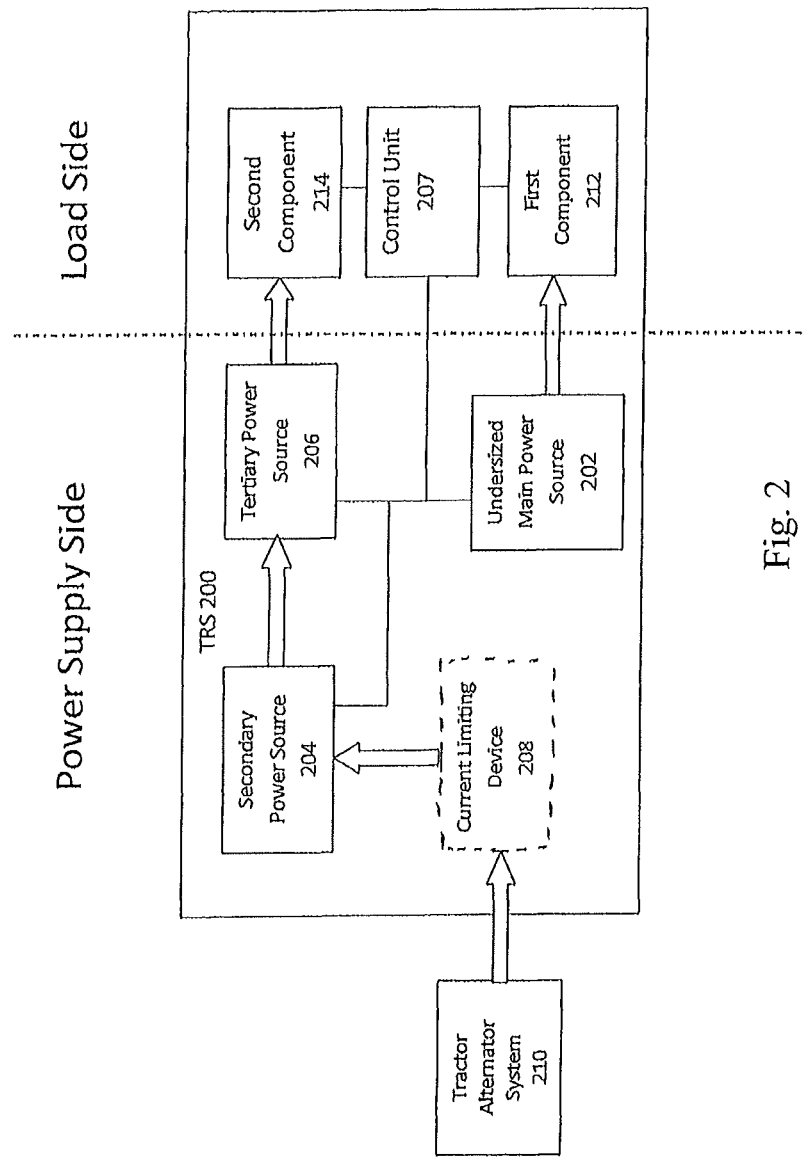
FIG. 2 illustrates a block diagram of an embodiment of a TRS having an undersized main power source and a secondary power source used connected to a tractor alternator system.

FIG. 2 illustrates a block diagram of an embodiment of a TRS 200 of a refrigerated transport unit (not shown) connected to a tractor alternator system 210 of a tractor (not shown). As shown in FIG. 2, power sources including an undersized main power source 202, a secondary power source 204, and a tertiary power source 206 are located on a power supply side of the TRS 200. First and second components 212, 214 and a control unit 207, are located on a load side of the TRS 200.

The TRS 200 is driven by the undersized main power source 202 in combination with the secondary power source 204, and the tertiary power source 206. While the TRS 200 in FIG. 2 includes the tertiary power source 206, in some embodiments, the TRS does not require a tertiary power source.

The TRS 200 can include a vapor-compressor type refrigeration system that uses a circulating liquid refrigerant as the medium to absorb and remove heat from a temperature controlled transport unit, such as the transport unit 125 shown in FIG. 1. When the TRS 200 includes a vapor-compressor type refrigeration system, a TRU (not shown) of the TRS can include, for example, a compressor, an evaporator, a condenser, a valve, a controller and a fan. It would be appreciated that the TRS can include any other suitable refrigeration systems that can be run by the undersized main power source in combination with the secondary power source. For example, the TRS 200 can include a supercritical $CO_2$ system, an open cycle cryogenics system, etc.

As shown in FIG. 2, the control unit 207 of the TRU (not shown) of the TRS 200 is operatively connected to, and configured to control the undersized main power source 202, the secondary power source 204, the tertiary power source 206, the first and second components 212, 214, and/or other components of the TRS 200.

The undersized main power source 202 and the secondary power source 204 each are unable to power the TRS 200 at a full cooling capacity on their own. That is, neither the undersized main power source 202 nor the secondary power source 204 can supply a sufficient amount of power by itself to run the TRS 200 at the full cooling capacity. For example, in one embodiment, the undersized main power source 202 has a maximum threshold power of about 25 HP, and the TRS 200 requires greater than 25 HP of power to run at a full cooling capacity.

As shown in FIG. 2, the undersized main power source 202 is supplemented by the secondary power source 204 to power the TRS 200 at the full cooling capacity. The undersized main power source 202 is operatively connected to the first component 202 of the TRS 200. The secondary power source 204 is operatively connected to the second component 214 of the TRS 200 through the tertiary power source 206. In one embodiment, the undersized main power source 202 and the secondary power source 204 can work in a tandem configuration to drive the TRS 200.

In one embodiment, the undersized main power source 202 can be a diesel engine having a maximum threshold power that is lower than the amount of power required to operate the TRS 200 at a full cooling capacity. It will be appreciated that the undersized main power source 202 is not limited to a diesel engine and can be any suitable engine having a maximum threshold power that is lower than the amount of power required to operate the TRS 200 at a full cooling capacity.

The undersized main power source 202 is configured to run the first component 212 of the TRS 200. The first component 212 can be, for example, a compressor of the TRS 200. The first component 212 can also include one or more other components of the TRS 200, for example, an internal alternator for electric power that can supply electric power for the control unit 207, etc.

The secondary power source 204 is configured to run the second component 214 of the TRS 200. The second component 214 can include one or more components, for example, electric fans, valves, and/or controllers, etc., of the TRS 200.

It will be appreciated that the undersized main power source 202 and the secondary power source 204 each can be configured to run any components of the TRS 200 so long as the TRS 200 can be powered by the undersized main power source 202 with the secondary power source 204 to run at a full cooling capacity.

In the embodiment shown in FIG. 2, the secondary power source 204 and the control unit 207 are each connected to the tertiary power source 206. The secondary power source 204 provides electrical power drawn from an alternator of the tractor alternator system 210 to supplement the undersized main power source 202 for supplying power for the TRS 200. It will be appreciated that in other embodiments, the secondary power source can be directly connected to either the first component or the second component for supplementing the undersized main power source to power the TRS. For example, in some embodiments, the secondary power source can directly connected to and power the second component (e.g., electric fans, valves, and/or controllers, etc.) of the TRS. Also, in some embodiments, the TRS may not include the tertiary power source. In some embodiments, the secondary power source can also be directed connected to the first or second component without going through the control unit.

In some embodiments, the tertiary power source 206 can include a battery or a battery bank. The tertiary power source 206 can be used to allow for continued operation of the TRS 200 when power is not available from the secondary power source 204. The tertiary power source 206 can also be used to power other accessories such as tail lifts on the refrigerated transport unit. Charging of the tertiary power source 206 can be performed when the TRS 200 has relatively low power consumption, for example, a power consumption at which the undersized main power source 202 can power the TRS 200 on its own so that the tertiary power source 206 can be charged. In some embodiments, the power consumption of the TRS 200 can be related to the current capacity of a power supply for the TRS 200, which can be limited to be, for example, about 32 amps or lower. Charging of the tertiary power source 206 can also be performed when the TRS 200 is connected to a shore power (e.g., power from a main electric grid, etc.).

The TRS 200 further includes an optional current limiting device 208 that is operatively connected to the secondary power source 204. The current limiting device 208 is configured to limit a maximum current that can be drawn from the secondary power source 204 to prevent possible damage to the secondary power source 204. The maximum current drawn from the secondary power source 204 to the TRS 200 can be set by, for example, the control unit 207. When the control unit 207 determines that the maximum current draw from the secondary power source 204 is reached, the tertiary power source 206, e.g., a battery or a battery bank, can allow for additional power to be supplied to the TRS 200, so that the secondary power source 204 can be protected from damage.

In some embodiments, the TRS 200 can be mostly mechanically driven whereby some components of the TRS 200 such as, for example, fans, alternators, etc., are driven by, for example, belts. The secondary power source 204 can be used to drive, for example, the second component 214 shown in FIG. 2, electronics and/or DC electric fans for a remote evaporator, etc., of the TRS 200. The undersized main power source 202 can be used to drive, for example, the first component 212 shown in FIG. 2, fans, alternators, etc., of the TRS 200.

In some embodiments, the TRS 200 can be mostly electrically driven whereby electric fans can be disposed in a host unit and/or an electric compressor, and some components of the TRS 200 such as, for example, fans, alternators, etc. can include electric motors. In these embodiments, an electrical generator such as, for example, the undersized main power source 202 shown in FIG. 2, can run directly to power components of the TRS 200, such as, for example, the first and/or second components 212, 214 shown in FIG. 2, etc. The power supplied from the secondary power source 204 can be used to reduce the load on the undersized main power source 202.

Figure 3:
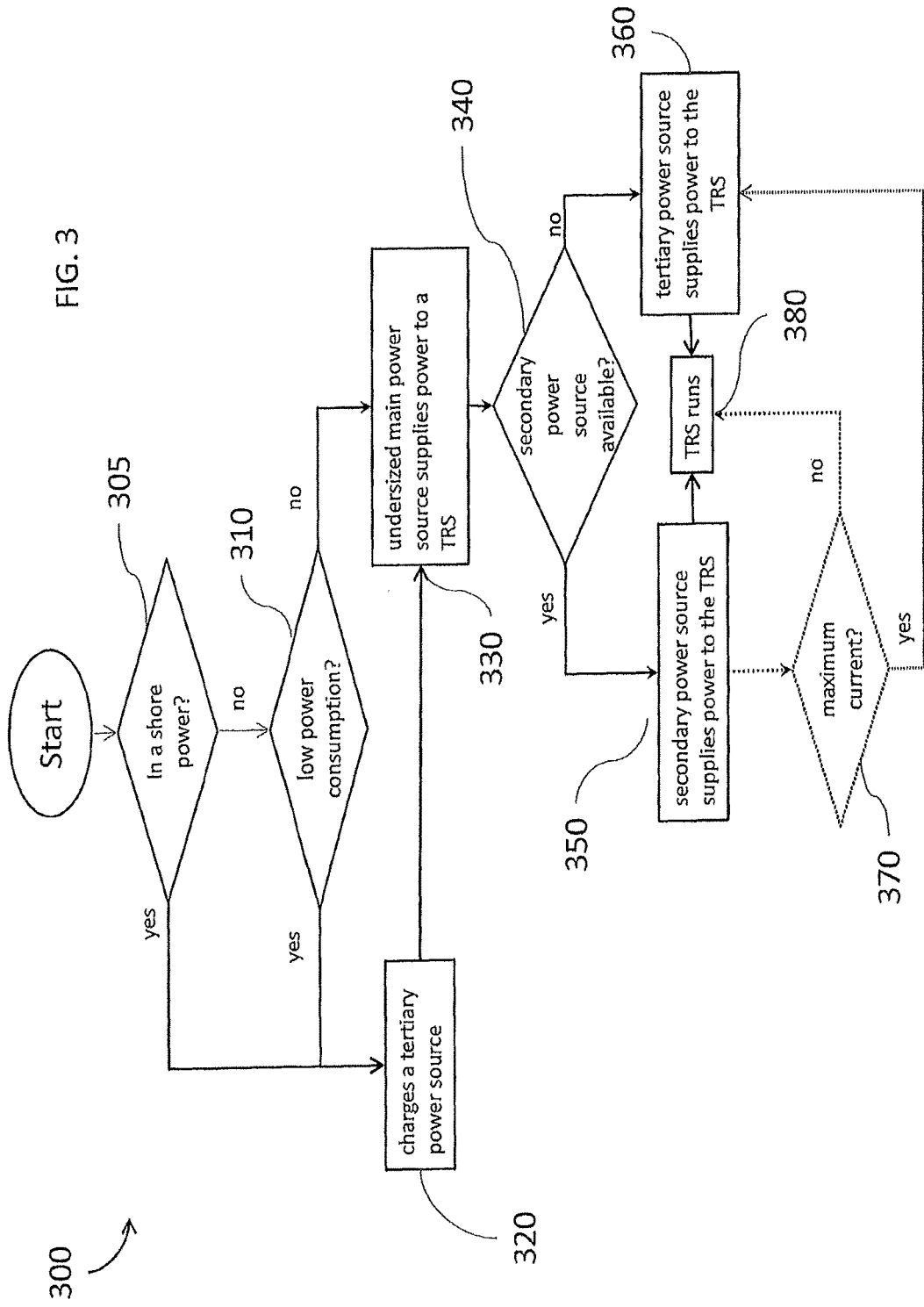
FIG. 3 illustrates a flow diagram of an embodiment of a method of supplying power to a TRU of a TRS.

FIG. 3 illustrates a flow diagram of a method 300 of supplying power for the TRS 200, according to one embodiment. At 305, the control unit 207 determines whether the TRS 200 is plugged into a shore power. If the TRS 200 is in a shore power, the method 300 proceeds to 320. If the TRS 200 is not in a shore power, the method 300 proceeds to 310.

At 310, the control unit 207 determines whether the TRS 200 currently has relatively low power consumption, for example, a power consumption at which the undersized main power source 202 can power the TRS 200 on its own. In some embodiments, the power consumption of the TRS can be related to the current capacity of a power supply for the TRS, which can be limited to be, for example, about 32 amps or lower. If the TRS 200 has relatively low power consumption, the method 300 proceeds to 320. If the TRS 200 has a power consumption higher than the low power consumption, the method 300 proceeds to 330.

At 320, the tertiary power source 206 is charged by the secondary power source 204. In some embodiments, the tertiary power source 206 can include a battery or a battery bank. In some embodiments, the tertiary power source 206 can be charged by a power source other than the secondary power source 204, for example, solar panels, a dynamo on wheels of a refrigerated transport unit, a vapor motor powered by exhaust from an open cycle cryogenics system, etc. The method 300 then proceeds to 330.

At 330, the undersized main power source 202 supplies power for the TRS 200. The undersized main power source 202, by itself, is not capable of generating a sufficient amount of power to the TRS 200 to allow the TRS 200 to operate at a full cooling capacity. In one embodiment, the undersized main power source 202 has a maximum threshold power of, for example, about 25 HP. In one embodiment, the undersized main power source 202 supplies power for the first component 212 of the TRS 200. The method 300 then proceeds to 340.

At 340, the control unit 207 determines whether there is a secondary power source available. If there is a secondary power source available, the method 300 proceeds to 350. If there is no secondary power source available, the method 300 proceeds to 360.

At 350, the secondary power source 204 supplies power for the TRS 200. The secondary power source 204, by itself, also cannot supply sufficient power to operate the TRS 200 at a full cooling capacity. That is, neither the undersized main power source 202 nor the secondary power source 204, alone, is capable of generating sufficient power to run the TRS 200 at the full cooling capacity. In one embodiment, the secondary power source 204 is configured to supply power for the second component 214 of the TRS 200. The undersized main power source 202 can be supplemented by the secondary power source 204 to power the TRS 200 at the full cooling capacity. The method 300 then proceeds to 380.

At 360, the tertiary power source 206 supplies power for the TRS 200. The tertiary power source 206, by itself, also cannot supply sufficient power to operate the TRS 200 at a full cooling capacity. That is, neither the undersized main power source 202 nor the tertiary power source 206, alone, is capable of generating sufficient power to run the TRS 200 at the full cooling capacity. In one embodiment, the tertiary power source 206 is configured to supply power for the second component 214 of the TRS 200. The undersized main power source 202 is supplemented by the tertiary power source 206 to power the TRS 200 at the full cooling capacity. The method 300 then proceeds to 380.

At 380, the TRS 200 is powered by the undersized main power source 202 in combination with a secondary power source including the secondary power source 204 and/or the tertiary power source 206, to run at the full cooling capacity.

Optionally, in some embodiments, when the secondary power source 204 supplies power for the TRS 200, the method 300 proceeds to 370. At 370, the control unit 207 determines whether the maximum current drawn from the secondary power source 204 to the TRS 200 is reached. If the maximum current draw is reached, the method 300 proceeds to 360 where the undersized main power source 202 is supplemented by the secondary power source 204 and the tertiary power source 206 to power the TRS 200 at the full cooling capacity. If the maximum current draw is not reached, the method 300 proceeds to 380 where the undersized main power source 202 is supplemented by the secondary power source 204 to power the TRS 200 at the full cooling capacity.

It is to be understood that a secondary power source described herein that can supplement the amount of power supplied by an undersized main power source, can be the secondary power source 204, the tertiary power source 206, or the secondary power source 204 and the tertiary power source 206.

Aspects:

It is noted that any of aspects 1-8 below can be combined with any of aspects 9-17.

Aspect 1. A transport refrigeration system (TRS), comprising:

an undersized main power source configured to generate up to a maximum threshold power that is lower than an amount of power sufficient to run the TRS at a full cooling capacity; and a secondary power source configured to generate up to the maximum threshold power that is lower than the amount of power sufficient to run the TRS at the full cooling capacity, wherein the undersized main power source and the secondary power source are configured to cooperate with one another to supply power to the TRS at the full cooling capacity.

Aspect 2. The transport refrigeration system of aspect 1, wherein the maximum threshold power of the undersized main power source is at or below 25 horsepower (HP).

Aspect 3. The transport refrigeration system of any of aspects 1-2, wherein the secondary power source is configured to provide electrical power drawn from an alternator of a tractor connected to the TRS.

Aspect 4. The transport refrigeration system of any of aspects 1-3, further comprising a tertiary power source.

Aspect 5. The transport refrigeration system of aspect 4, wherein the tertiary power source includes a battery bank.

Aspect 6. The transport refrigeration system of any of aspects 1-5, wherein the undersized main power source includes a diesel engine.

Aspect 7. The transport refrigeration system of any of aspects 1-6, further comprising a control unit, an electric fan, a compressor, and an evaporator powered by the undersized main power source or the secondary power source.

Aspect 8. The transport refrigeration system of aspect 3, further comprising a current limiting device operatively connected to the secondary power source and configured to set a maximum current drawn from the secondary power source.

Aspect 9. A method of supplying power to a transport refrigeration system (TRS), the method comprising:
supplying a first amount of power to the TRS from an undersized main power source, the first amount of power being lower than an amount of power required to allow the TRS to operate at a full cooling capacity; and
supplying a second amount of power to the TRS from a secondary power source, the second amount of power being lower than the amount of power required to allow the TRS to operate at the full cooling capacity,
the secondary power source supplementing the undersized main power source to allow the TRS to operate at the full cooling capacity.

Aspect 10. The method of aspect 9, further comprising determining whether a secondary power source is available.

Aspect 11. The method of any of aspects 9-10, further comprising supplying a third amount of power to the TRS from a tertiary power source when the secondary power source is not available, the third amount of power being lower than the amount of power to allow the TRS to operate at the full cooling capacity, the tertiary power source supplementing the undersized main power source to allow the TRS to operate at the full cooling capacity.

Aspect 12. The method of any of aspects 9-11, wherein the maximum threshold power of the undersized main power source is at or below 25 HP.

Aspect 13. The method of any of aspects 9-12, further comprising drawing, via the secondary power source, electrical power from an alternator of a tractor connected to the TRS, and providing the electrical power to the TRS.

Aspect 14. The method of any of aspects 9-13, further comprising determining whether a maximum current is drawn from the secondary power source, and
supplying power to the TRS from a tertiary power source to supplement the undersized main power source to allow the TRS to operate at the full cooling capacity when the maximum current is drawn from the secondary power source.

Aspect 15. The method of aspect 11, further comprising determining whether the TRS is being powered by a shore power, and
charging a battery or a battery bank of the tertiary power source when the TRS is being powered by the shore power.

Aspect 16. The method of any of aspects 9-15, further comprising determining whether the TRS is demanding a low power consumption level that is lower than the amount of power required to allow the TRS to operate at the full cooling capacity, and
charging a battery or a battery bank of the tertiary power source when the TRU is demanding the low power consumption level.

Aspect 17. The method of aspect 13, further comprising limiting, via a current limiting device, a maximum current drawn from the secondary power source.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A transport refrigeration system (TRS), comprising:
an undersized main power source that is only capable of generating up to but not more than a first maximum threshold power;
a secondary power source that is only capable of generating up to but not more than a second maximum threshold power that is lower than an amount of power sufficient to run the TRS at a full cooling capacity;
a tertiary power source; and
a controller,
wherein the TRS requires more than the first maximum threshold power to operate at a full cooling capacity,
wherein the TRS requires more than the second maximum threshold power to operate at the full cooling capacity,
wherein the TRS requires less than a total of the first maximum threshold power and the second maximum threshold power to operate at the full cooling capacity,
wherein the undersized main power source and the secondary power source are configured to cooperate with one another to supply a supply power to the TRS at the full cooling capacity, and
wherein the undersized main power source supplies a first amount of the supply power to the TRS, the first amount of the supply power being lower than an amount of power required to allow the TRS to operate at the full cooling capacity,
wherein the secondary power source supplies a second amount of the supply power to the TRS, the second amount of the supply power being lower than the amount of power required to allow the TRS to operate at the full cooling capacity, to supplement the undersized main power source in order to allow the TRS to operate at the full cooling capacity,
wherein the controller determines whether a maximum current is drawn from the secondary power source, and
wherein the tertiary power source supplies power to the TRS to supplement the undersized main power source to allow the TRS to operate at the full cooling capacity when the maximum current is drawn from the secondary power source.

2. The transport refrigeration system of claim 1, wherein the first maximum threshold power of the undersized main power source is at or below 25 horsepower (HP).

3. The transport refrigeration system of claim 1, wherein the secondary power source is configured to provide electrical power drawn from an alternator of a tractor connected to the TRS.

4. The transport refrigeration system of claim 1, wherein the tertiary power source includes a battery bank.

5. The transport refrigeration system of claim 1, wherein the undersized main power source includes a diesel engine.

6. The transport refrigeration system of claim 1, further comprising a control unit, an electric fan, a compressor, and an evaporator powered by the undersized main power source or the secondary power source.

7. The transport refrigeration system of claim 3, further comprising a current limiting device operatively connected to the secondary power source and configured to set the maximum current drawn from the secondary power source.

8. A method of supplying power to a transport refrigeration system (TRS), the method comprising:
    supplying a first amount of power to the TRS from an undersized main power source, the first amount of power being lower than an amount of power required to allow the TRS to operate at a full cooling capacity;
    supplying a second amount of power to the TRS from a secondary power source, the second amount of power being lower than the amount of power required to allow the TRS to operate at the full cooling capacity, the secondary power source supplementing the undersized main power source to allow the TRS to operate at the full cooling capacity;
    determining whether a maximum current is drawn from the secondary power source, and
    supplying power to the TRS from a tertiary power source to supplement the undersized main power source to allow the TRS to operate at the full cooling capacity when the maximum current is drawn from the secondary power source.

9. The method of claim 8, further comprising determining whether the TRS is demanding a low power consumption level that is lower than the amount of power required to allow the TRS to operate at the full cooling capacity, and
    charging a battery or a battery bank of the tertiary power source when the TRS is demanding the low power consumption level.

10. The transport refrigeration system of claim 1, wherein the undersized main power source supplies the first amount of the supply power to a compressor of the TRS and the secondary power source supplies the second amount of the supply power to one of a fan, a valve and a controller of the TRS.

11. The method of claim 8, further comprising:
    the undersized main power source supplying power to a compressor of the TRS; and
    the secondary power source supplying power to one of a fan, a valve and a controller of the TRS.

12. The transport refrigeration system of claim 1, wherein the tertiary power source is charged by one or more of: a solar panel, a dynamo on wheels of a refrigerated transport unit that has the transport refrigeration system, and a vapor motor powered by exhaust from an open cycle cryogenics system.

13. The method of claim 8, further comprising charging the tertiary power source by one or more of: a solar panel, a dynamo on wheels of a refrigerated transport unit that has the transport refrigeration system, and a vapor motor powered by exhaust from an open cycle cryogenics system.

14. The method of claim 8, further comprising determining whether a secondary power source is available.

15. The method of claim 8, further comprising supplying a third amount of power to the TRS from the tertiary power source when the secondary power source is not available, the third amount of power being lower than the amount of power to allow the TRS to operate at the full cooling capacity, the tertiary power source supplementing the undersized main power source to allow the TRS to operate at the full cooling capacity.

16. The method of claim 15, further comprising determining whether the TRS is being powered by a shore power, and
    charging a battery or a battery bank of the tertiary power source when the TRS is being powered by the shore power.

17. The method of claim 8, wherein the first maximum threshold power of the undersized main power source is at or below 25 horsepower (HP).

18. The method of claim 8, further comprising drawing, via the secondary power source, electrical power from an alternator of a tractor connected to the TRS, and providing the electrical power to the TRS.

19. The method of claim 18, further comprising limiting, via a current limiting device, a maximum current drawn from the secondary power source.

* * * * *